United States Patent
Yanagimoto et al.

(10) Patent No.: US 8,163,668 B2
(45) Date of Patent: Apr. 24, 2012

(54) INORGANIC ELECTROLYTE SETTING AGENT CAPABLE OF RENDERING HEAVY METAL ION NONHAZARDOUS AND METHOD OF TREATMENT FOR UTILIZATION AS RESOURCE THEREWITH

(75) Inventors: Yukio Yanagimoto, Osaka (JP); Kayohiko Tanimoto, Sodegaura (JP)

(73) Assignees: Kayohiko Tanimoto, Chiba (JP); Hiroshi Yamaoka, Chiba (JP)

( * ) Notice: Subject to any disclaimer, the term of this patent is extended or adjusted under 35 U.S.C. 154(b) by 692 days.

(21) Appl. No.: 12/225,171

(22) PCT Filed: Mar. 17, 2006

(86) PCT No.: PCT/JP2006/305338
§ 371 (c)(1),
(2), (4) Date: Sep. 16, 2008

(87) PCT Pub. No.: WO2007/108059
PCT Pub. Date: Sep. 27, 2007

(65) Prior Publication Data
US 2009/0209801 A1    Aug. 20, 2009

(51) Int. Cl.
*B01J 20/02*    (2006.01)
(52) U.S. Cl. ........ 502/406; 502/515; 502/516; 588/315; 588/901
(58) Field of Classification Search .......... 502/406, 502/408, 411, 414, 515, 516; 588/315, 901
See application file for complete search history.

(56) References Cited

U.S. PATENT DOCUMENTS

| 6,077,439 A * | 6/2000 | El-Ammouri et al. ........ 210/665 |
| 6,137,027 A * | 10/2000 | Kawashima et al. .......... 588/316 |
| 2004/0034267 A1 * | 2/2004 | Forrester ...................... 588/256 |
| 2005/0049449 A1 * | 3/2005 | Forrester ...................... 588/256 |

FOREIGN PATENT DOCUMENTS

| JP | 60-248296 A | 12/1985 |
| JP | 8-192128 A | 7/1996 |
| JP | 10-8029 A | 1/1998 |
| JP | 2000-15220 A | 1/2000 |
| JP | 2000-198981 A | 7/2000 |
| JP | 2001-104998 A | 4/2001 |

* cited by examiner

*Primary Examiner* — Edward Johnson
(74) *Attorney, Agent, or Firm* — Birch, Stewart, Kolasch & Birch, LLP

(57) ABSTRACT

The invention provides an inorganic electrolyte setting agent capable of blocking hazardous heavy metals almost permanently and further usable as resources, based on the geological balance of elements, and a treating method for utilization as resources using the same. There is provided an inorganic electrolyte setting agent capable of rendering heavy metal ions nonhazardous, including an aqueous solution as a main agent mixed with A below and also at least one of B and C below: (A) sulfuric acid, (B) at least one of aluminum sulfate and polyaluminum sulfate, (C) at least one of polyferric sulfate and ferric chloride; and an aqueous solution as a concomitant agent mixed with D below: (D) at least one of potassium silicate and sodium silicate.

2 Claims, No Drawings

INORGANIC ELECTROLYTE SETTING AGENT CAPABLE OF RENDERING HEAVY METAL ION NONHAZARDOUS AND METHOD OF TREATMENT FOR UTILIZATION AS RESOURCE THEREWITH

TECHNICAL FIELD

This invention relates to an inorganic electrolyte setting agent capable of rendering heavy metal ions contained in burned ash of municipal waste, heavy metal contaminated soil in sites of former plants, etc., nonhazardous and a method of treatment for utilization as resources using the same.

BACKGROUND ART

Patent literature 1: Japanese Published Unexamined Patent Application No. 2000-198981.

DISCLOSURE OF THE INVENTION

Problems to be Solved by the Invention

A variety of elements exist as chemical compounds in soil in the natural world. This is true of elements hazardous to human beings. For example, it has been said that lead is contained in soil at 2 to 200 mg/kg. However, there has not been a case reported where lead in soil adversely affects human health. The reason for this may be that each element exists in a form of a complex compound.

For example, it has been considered that this is because each element forms a complex compound (chain ionic bonding) with chlorides of metals, calcium salt, silica, sulfate, phosphoric acid, sulfur salt, etc., and then exists in a remarkably stable state chemically. Thus, hazardous elements in nature cannot be transferred to the human biosphere, that is, groundwater, rivers, oceans, etc.

On the other hand, lead compounds in a deep geologic stratum which cannot be contacted with oxygen exist in a state of lead sulfide. However, the lead compounds are easily transferred as lead ions once contacted with oxygen. This is true of other elements other than lead. In this connection, mine pollution (mineral poison) problems arise from the above.

Conventionally, a variety of treatments (chelating agents) against heavy metal ions hazardous to human beings have been developed and widely been used in heavy metal immobilization treatment for hazardous objects to be treated such as contaminated soil, burned ash, etc. An invention described in Patent literature 1 can be included, for example.

However, the chelating agent is composed of an organic substance and contains, for example, a pyrrolidine-type, imine-type or carbamic acid-type organic agent as a main ingredient. Such an organic substance is subjected to denaturation and deterioration, and its effects cannot be expected permanently by definition of an organic matter.

Therefore, there is no other choice for the aforementioned hazardous objects to be treated but to be landfilled at final disposal sites nowadays. In fact, the majority of burned ash of municipal waste and more than half of contaminated soil are disposed of by landfill.

However, it is becoming increasingly difficult to secure final disposal sites, recently. Further, although the burned ash has a practical use of being slagged in a melting furnace and used in an aggregate of concrete, the burned ash requires vast plant and equipment investment. As a result, it is hard to say that the adoption has been widespread. It is the current situation that the above has been a source of common concern among local governments throughout the country.

The present invention was made in view of the foregoing circumstances, and accordingly an object of the present invention is to provide an inorganic electrolyte setting agent capable of blocking hazardous heavy metals almost permanently and further usable as resources, based on the geological balance of elements, and a treating method for utilization as resources using the same.

Means for Solving the Problems

In order to solve the foregoing problems, a first aspect of the present invention provides an inorganic electrolyte setting agent capable of rendering heavymetal ions nonhazardous, including an aqueous solution as a main agent mixed with A below and also at least one of B and C below, (A) sulfuric acid, (B) at least one of aluminum sulfate and polyaluminum sulfate, (C) at least one of polyferric sulfate and ferric chloride; and an aqueous solution as a concomitant agent mixed with D below, (D) at least one of potassium silicate and sodium silicate.

A second aspect of the present invention provides an inorganic electrolyte setting agent capable of rendering heavy metal ions nonhazardous according to the first aspect of the present invention, wherein the main agent is further mixed with at least one of E and F below, (E) ferric sulfate, (F) at least one of magnesium chloride and magnesium sulfate.

A third aspect of the present invention provides an inorganic electrolyte setting agent capable of rendering heavy metal ions nonhazardous according to either one of the first or the second aspect of the present invention, wherein the concomitant agent is further mixed with at least one of G and H below, (G) at least one of barium ferrite magnet, sodium aluminate and sodium hexametaphosphate, (H) sodium polyacrylate.

A fourth aspect of the present invention provides an inorganic electrolyte setting agent capable of rendering heavy metal ions nonhazardous according to the third aspect of the present invention, including an aqueous solution mixed with the above A, B, C, E and F as the main agent and an aqueous solution mixed with the above D, G and H as the concomitant agent, wherein a mixing ratio by weight in the main agent is such that water is 100 to 250, the above A is 2 to 5, the above B is 250 to 600, the above C is 80 to 250, the above E is 10 to 50 and the above F is 5 to 10; and a mixing ratio by weight in the concomitant agent is such that water is 100 to 300, the above D is 500 to 1000, the above G is 50 to 150 and the above H is 2 to 5.

A fifth aspect of the present invention provides a method of treatment for utilization as resources using an inorganic electrolyte setting agent, configured to use an inorganic electrolyte setting agent according to any one of the first to the fourth aspects of the present invention, including mixing the main agent to an object to be treated and then mixing the concomitant agent, thereby allowing heavy metal ions in the object to be treated to be blocked.

BEST MODE FOR CARRYING OUT THE INVENTION

Hereinafter, an embodiment of the present invention is described.

An inorganic electrolyte setting agent according to the present invention is a heavy metal immobilizing agent composed of two solutions wherein a main agent is synthetically mixed with several kinds of positively charged inorganic substances with different ionic valencies in a solvent solution and is reformed into a positively charged polyvalent metal setting agent inducing hydration reactions which are unachievable by a single charge, in a remarkably wide neutralization region due to a synergistic effect and having treating accuracy, and a concomitant agent principally contains sodium silicate and is synthetically mixed with several kinds of sodium having a metal ion blocking ability and a coagulation effect in a solvent solution.

Ingredients mixed in the inorganic electrolyte setting agent of the embodiment are as shown in Table 1.

TABLE 1

| Symbols | Chemical names | Chemical symbols | Mixing ratio by weight (g) |
|---|---|---|---|
| | | Main agent | |
| — | Water | $H_2O$ | 100 to 250 |
| A | Sulfuric acid | $H_2SO_4$ | 2 to 5 |
| B | Aluminum sulfate | $Al_2(SO_4)_3 \cdot xH_2O$ | 250 to 600 |
| C | Polyferric sulfate | $[Fe_2(OH)_n(SO_4)_{3-n/2}]m$ | 80 to 250 |
| E | Ferric sulfate | $Fe_2(SO_4)_3$ | 10 to 50 |
| F | Magnesium chloride | $MgCl_2 \cdot 6H_2O$ | 5 to 10 |
| | | Concomitant agent | |
| — | Water | $H_2O$ | 100 to 300 |
| D | Potassium silicate | $K_2O \cdot nSiO_2 nH_2O$ | 500 to 1000 |
| G | Barium ferrite magnet powder | $BaO \cdot 6Fe_2O_3$ | 50 to 150 |
| H | Sodium polyacrylate | $-[CH_2-CH(COONa)]_n-$ | 2 to 5 |

Water is used as a solvent in the ingredients of the main agent listed above. Water used herein is preferably chlorine-free, for example, groundwater.

Sulfuric acid (ingredient A in the table, the same shall apply hereinafter) keeps the main agent acidic and prevents separation and precipitation of each sodium.

Aluminum sulfate (B) is so-called alum, and reacts with $SiO_2$, CaO, etc., as an activated alumina and serves as a main ingredient of various precipitated crystals. Instead of aluminum sulfate, the same amount of polyaluminum sulfate can be used. Further, aluminum sulfate and polyaluminum sulfate can be used in combination.

Polyferric sulfate (C) is a polymer constituting a polynuclear complex. Polyferric sulfate coagulates even under a low temperature, reacts with $SiO_2$ sensitively and constructs an insoluble crystal. Instead of polyferric sulfate, the same amount of ferric chloride can be used. Further, polyferric sulfate and ferric chloride can be used in combination.

Mixing of either one of aluminum sulfate (polyaluminum sulfate) or polyferric sulfate (ferric chloride) may be omitted.

Ferric sulfate (E) is a low molecular coagulant. Combined with the aforementioned high molecular polyferric sulfate, ferric sulfate allows for extensive coagulation. Mixing of ferric sulfate may be omitted.

Magnesium chloride (F) is so-called bittern, and undertakes an improvement in dewaterbility of objects to be treated and an auxiliary-agent-like role in the aforementioned coagulation reaction. Instead of magnesium chloride, the same amount of magnesium sulfate can be used. Further, magnesium chloride and magnesium sulfate can be used in combination. Mixing of magnesium chloride and magnesium sulfate may be omitted.

Water is used as a solvent in the ingredients of the concomitant agent listed above, too. Similar to the main agent, water is preferably chlorine-free, for example, groundwater.

Potassium silicate (D) is a main ingredient of effect stabilizers for soil. Potassium silicate reacts with polyvalent metal ions, CaO, etc., sensitively and constructs various insoluble crystals. In the present embodiment, industrial potassium silicate which is a colorless or slightly colored viscous liquid is used. The industrial potassium silicate is soluble in water and liberates silica gel by acid. Instead of potassium silicate, the same amount of sodium silicate can be used. Further, potassium silicate and sodium silicate can be used in combination. Potassium silicate (sodium silicate) can be used as a concomitant agent independently.

Barium ferrite magnet (G) has an ability of blocking metal ions and improves properties of objects to be treated. Barium ferrite magnet also enhances dispersibility of inorganic agents during treating. Instead of barium ferrite magnet, the same amount of sodium aluminate or sodium hexametaphosphate can be used. Further, at least two of barium ferrite magnet, sodium aluminate and sodium hexametaphosphate can be selectively used in combination. Mixing of barium ferrite magnet, sodium aluminate and sodium hexametaphosphate may be omitted.

Sodium polyacrylate (H) is a polymer and has an ability to electrostatically strongly attract and coagulate positively charged metal colloidal particles in an acid region. Thus, sodium polyacrylate is capable of prompt treating. Mixing of sodium polyacrylate may be omitted.

Now, a manufacturing method of the main agent will be described. First, a specified amount of chlorine-free water such as groundwater is heated to about 75 degrees Centigrade. Then, a specified amount of magnesium chloride (F) is put in and lightly stirred (for about 3 minutes). Perfect dissolution of magnesium chloride (F) is checked. A specified amount of sulfuric acid (A) is then put in, lightly stirred (for about 2 minutes) and mixed well. Subsequently, a specified amount of aluminum sulfate (B) is put in and lightly stirred and mixed (for about 2 minutes). At this moment, a check that a temperature of the aqueous solution is kept at about 75 degrees Centigrade is made. Subsequently, specific amounts of polyferric sulfate (C) and ferric chloride (E) are put in and lightly stirred and mixed (for about 2 minutes). At this moment, a check that a temperature of the aqueous solution is kept at about 75 degrees Centigrade is made, thereupon completing the manufacturing of the main agent. After that, the finished main agent is left at rest and enclosed and stored in a container after reaching room temperature.

Now, a manufacturing method of the concomitant agent will be described. First, a specified amount of chlorine-free water such as groundwater is heated to about 75 degrees Centigrade. After that, a specified amount of sodium polyacrylate (H) is put in and stirred (for about 10 minutes). Perfect dissolution of sodium polyacrylate (H) is checked and then a specified amount of barium ferrite magnet (G) is put in and stirred (for about 5 minutes). Perfect dissolution of barium ferrite magnet (G) is checked, and subsequently a specified amount of potassium silicate (D) is put in and lightly stirred and mixed (for about 2 minutes). At this moment, a check that a temperature of the aqueous solution is kept at about 75 degrees Centigrade is made, thereupon completing the manufacturing of the concomitant agent. After that, the finished concomitant agent is left at rest and enclosed and stored in a container after reaching room temperature.

Subsequently, a specific treating method for blocking heavy metal ions contained in an artificially contaminated substance will be described. Exemplified herein is a case where an object to be treated is burned ash of municipal waste or heavy metal contaminated soil in sites of former plants, etc.

First, the object to be treated is sprayed with water and stirred so as to pervade water uniformly. A water content shall be about 95%. A specified amount of the main agent is uniformly put into the object to be treated in the above state, and stirred and mixed well for 10 to 15 minutes. Next, a specified amount of the concomitant agent is put in uniformly and stirred and mixed well for 10 to 15 minutes. A combination ratio in the inorganic electrolyte setting agent shall be such that both of the main agent and the concomitant agent are 2.5% by weight relative to the object to be treated. The treating for blocking heavy metals in the object to be treated is completed. The object to be treated is left at rest for 24 hours or longer in a protected state against rainwater by, for example, being covered with a construction sheet.

Subsequently, a specific treating method for utilizing the object to be treated to which the above treatment has been done as resources will be described. Exemplified herein first is a case where burned ash of municipal waste is used as the object to be treated will be described.

Burned ash having been treated as described above is stirred and mixed well with mountain sand, construction waste soil, etc. A mixing ratio of the burned ash to the mountain sand, etc., is 40% to 60% by weight. Subsequently, water is added while the above mixture is stirred, thereupon being brought into a state of slurry. Potassium silicate or sodium silicate, which is 25% by weight, is put into the above and stirred and mixed well for 10 to 15 minutes. Further, slaked lime or unslaked lime, which is 30% by weight, is put in and stirred and mixed well for 10 to 15 minutes. A reason why potassium silicate, etc., and slaked lime, etc., are added, as described above, at the stage of treatment for utilization as resources is to stimulate latent hydraulic components in the burned ash and induce much stronger solidification strength, other than to adjust ingredients. The treatment for utilizing the object to be treated as resources is completed. The object to be treated is left at rest for 24 hours or longer in a protected state against rainwater by, for example, being covered with a construction sheet.

The subsequent process to the aforementioned process of adding water shall be carried out when heavy metal contaminated soil in sites of former plants is used as the object to be treated.

The object to be treated that has been treated for utilization as resources in the aforementioned manner is usable for various applications such as embankment reinforcement of rivers, lakes, etc., improvement for liquefaction prevention of sand, deep layer improvement of soft ground, construction of water channel ground, improvement of road base, slope protection, reclamation of contaminated soil in sites of former plants into backfill soil, temporary road building, etc.

Now, a specific treating method for blocking heavy metal ions contained in contaminants in nature will be described. Exemplified herein is a case where bottom mud in rivers, lakes, harbors, etc., is used as the object to be treated. The bottom mud provided for treatment is such that slurry bottom mud just after being dredged up is strained through a sieve with openings of about 10 mm to remove seashells, refuse, stones, etc.

First, the aforementioned bottom mud having been sieved is sprayed with water and stirred so as to pervade water uniformly. A water content shall be about 95%. A specified amount of the main agent is put into the object to be treated in the above state uniformly, and then stirred and mixed well for 10 to 15 minutes. Next, a specified amount of the concomitant agent is put in uniformly and stirred and mixed well for 10 to 15 minutes. A combination ratio in the inorganic electrolyte setting agent shall be such that both of the main agent and the concomitant agent are 20% by weight relative to the aforementioned bottom mud having been sieved. The treatment for blocking heavy metals in the object to be treated is completed. The object to be treated is left at rest for 24 hours or longer in a protected state against rainwater by, for example, being covered with a construction sheet.

Bottom mud is remarkably rich in organic matter since dead bodies of plants and animals have been deposited over the years. Thus, the bottom mud having been treated for blocking heavy metals in the above manner is best suited as a mineral activating organic fertilizer with an ability of reforming soil. In particular, land bottom mud is suitable for manuring fields, and harbor bottom mud is suitable for manuring rice fields.

The combination ratio in the inorganic electrolyte setting agent as exemplified above is an example, and can be changed as appropriate according to the composition of an object to be treated. Both of the main agent and the concomitant agent are used preferably in the range of 0.5 to 30% by weight, more preferably in the range of 2 to 10% by weight relative to the object to be treated.

Further, the inorganic electrolyte setting agent according to the present invention can exhibit a sufficient heavy metal blocking effect even if used alone. However, the setting agent can be used in combination with an existing chelating agent. In that case, the synergy of effect by the chelating agent composed of an organic substance and effect by the inorganic electrolyte setting agent can be expected early in the treatment. In addition, by definition of inorganic matter, permanent effect can be expected due to the inorganic electrolyte setting agent in which denaturation or deterioration hardly occurs.

Now, a demonstration test having been conducted using the inorganic electrolyte setting agent of the present embodiment is described below.

As the object to be treated, burned ash of municipal waste having been collected from a certain environmental sanitation center was used.

First, a content amount and a dissolution amount of heavy metals in the object to be treated were measured. A content amount test was carried out based on Bottom Sediment Examination Method II —Content Test of Water Quality Conservation Bureau Water Quality Management Division No. 127 officially announced by the Ministry of the Environment in Japan. A dissolution amount test was carried out based on the Dissolution Test of Official Announcement No. 13 by the Ministry of the Environment in Japan. A measurement of heavy metals in a dissolution solution was made based on Japanese Industrial Standards K-0102 'Testing Methods for Industrial Wastewater'. Results are listed in Table 2.

TABLE 2

Measurement results of content amounts and dissolution amounts
of heavy metals etc., in object to be treated (burned ash)

| Analysis items | Content amount (mg/kg) | Dissolution amount (mg/l) |
|---|---|---|
| Mercury or its compounds | 2.96 | Not detected (*) |
| Cadmium or its compounds | 10.5 | Not detected (*) |
| Lead or its compounds | 2300 | 3.0 |
| Total chromium | 267 | 0.09 |
| Arsenic or its compounds | 0.40 | Not detected (*) |
| Selenium or its compounds | 0.32 | 0.002 |
| PH | | 12.3 |

(*) less than 0.001 (mg/l)

The object to be treated was collected in a semispherical plastic container having 20 cm in diameter, and a predetermined amount of the inorganic electrolyte setting agent was added. More specifically, the main agent was added and blended uniformly by a spatula, and then the concomitant agent was added and blended uniformly by the spatula. Two different combination ratios in the inorganic electrolyte setting agent were tried in this case; both of the main agent and the concomitant agent were 3% and 6% by weight relative to the object to be treated. The object to be treated that has been added with the inorganic electrolyte setting agent was left at rest for 24 hours. After that, the same dissolution amount test as above was carried out. As shown in Table 2, dissolution values of heavy metals in the object to be treated (before treating) were not more than legal standard values except lead. Therefore, only dissolution of lead was measured in this dissolution amount test. Results are listed in Table 3.

TABLE 3

Test results of inorganic electrolyte setting
agent according to the present invention

| Sample No. | Mixing ratio by weight (%) | Dissolution amount of lead (mg/l) | PH |
|---|---|---|---|
| 1 | 3.0 | Not detected (*) | 12.0 |
| 2 | 6.0 | Not detected (*) | 11.9 |

(*) less than 0.001 (mg/l)

As the above-listed experimental results, dissolution of lead was not found in the objects to be treated that have been added with the inorganic electrolyte setting agent. Further, it was confirmed that heavy metals were satisfactorily immobilized and rendered nonhazardous even when the mixing ratio by weight in the inorganic electrolyte setting agent relative to the object to be treated was 3%. Accordingly, it can be said that the inorganic electrolyte setting agent according to the present invention is capable of exhibiting sufficient effect even with a small amount of use and thus is superior in cost efficiency.

Next, a demonstration test having been conducted using bottom mud as the object to be treated will be described below. For the object to be treated, three kinds were tried; lake mud, river mud and harbor mud. A mixing ratio in the inorganic electrolyte setting agent in this case was such that both of the main agent and the concomitant agent were 20% by weight relative to the object to be treated. A measuring method was the same as the foregoing burned ash case. Results are listed in Table 4.

TABLE 4

| | Analyses | | | Dissolution |
|---|---|---|---|---|
| | Content analysis | | Dissolution analysis | standards of Soil |
| | | Analysis target | | Contamination |
| | Untreated mud | | Treated mud | Countermeasures |
| Analysis items | | Units | Units | Law |
| (1) Lake mud | | | | |
| Water content | 11.7 | % | 10 % | % |
| Lead | 14 | ppm | 0.005 or less ppm | 0.01 or less |
| Arsenic | 8 | ppm | 0.001 or less ppm | 0.01 or less |
| Total mercury | 0.08 | ppm | 0.0005 or less ppm | 0.0005 or less |
| Selenium | 0.7 | ppm | 0.001 or less ppm | 0.01 or less |
| Boron | 11 | ppm | 0.1 or less ppm | 1 or less |
| Fluorine | 39.5 | ppm | 0.2 or less ppm | 0.8 or less |
| Nitrogen | 4990 | ppm | 8.1 ppm | |
| Phosphorus | 1600 | ppm | 0.4 ppm | |
| (2) River mud | | | | |
| Water content | 1.7 | % | 2.2 % | % |
| Total mercury | 0.03 | ppm | 0.0005 or less ppm | 0.0005 or less |
| Boron | 5 | ppm | 0.1 or less ppm | 1 or less |
| Fluorine | 57.2 | ppm | 0.3 ppm | 0.8 or less |
| Nitrogen | 380 | ppm | 2.4 ppm | |
| Phosphorus | 313 | ppm | 0.2 ppm | |
| (3) Harbor mud | | | | |
| Water content | 0.7 | % | 0.7 % | % |
| Total mercury | 0.01 | ppm | 0.0005 or less ppm | 0.0005 or less |
| Boron | 12 | ppm | 0.1 or less ppm | 1 or less |
| Fluorine | 37.7 | ppm | 0.2 or less ppm | 0.8 or less |
| Nitrogen | 313 | ppm | 2 ppm | |
| Phosphorus | 173 | ppm | 0.1 ppm | |

As the above-listed experimental results, the objects to be treated having been added with the inorganic electrolyte setting agent were reduced in concentration dramatically in every analysis item. It was confirmed that the inorganic electrolyte setting agent according to the present invention can exert sufficient effect as for bottom mud as well.

As described above, the inorganic electrolyte setting agent according to the present invention is a treatment particularly whose main agent is composed of an unprecedented perfectly inorganic agent, based on the definition of inorganic matter. The inorganic electrolyte setting agent also has superior treating accuracy and can contain hazardous substances in insoluble precipitated crystals that closely resemble natural geological laws, thereupon promoting the rendering nonhazardous of the hazardous substances almost permanently.

Further, according to the treating method for utilization as resources using the inorganic electrolyte setting agent in accordance with the present invention, contaminated soil and burned ash that are objects to be treated can be utilized as excellent resources as well as rendering nonhazardous can be promoted. Accordingly, there is no need to adopt a disposal method of merely landfilling at final disposal sites as in the conventional manner.

Further, reproduction of soil microorganisms are rendered stronger and circulation of natural ecosystem can be activated when the treatment according to the present invention is used to contaminated soil in the natural world such as land bottom mud, ocean bottom mud, etc. Consequently, remarkably excellent effect can be exhibited relative to vegetation.

Therefore, the inorganic electrolyte setting agent according to the present invention can be used effectively relative to a variety of objects to be treated such as burned ash of municipal waste and industrial waste, heavy metal contaminated soil in sites of former plants, industrial wastewater treatment sludge, river and lake sludge, harbor sludge, sewerage sludge, etc.

What is claimed is:

1. An inorganic electrolyte setting agent capable of rendering heavy metal ions nonhazardous, comprising:

an aqueous solution as a main agent mixed with A, B, C, E, and F below, (A) sulfuric acid, (B) at least one of aluminum sulfate and polyaluminum sulfate, (C) at least one of polyferric sulfate and ferric chloride, (E) ferric sulfate, (F) at least one of magnesium chloride and magnesium sulfate; and an aqueous solution as a concomitant agent mixed with D, G and H below, (D) at least one of potassium silicate and sodium silicate, (G) at least one of barium ferrite magnet, sodium aluminate and sodium hexametaphosphate., (H) sodium polyacrylate, wherein a mixing ratio by weight in the main agent is such that water is 100 to 250, the above A is 2 to 5, the above B is 250 to 600, the above C is 80 to 250, the above E is 10 to 50 and the above F is 5 to 10; and a mixing ratio by weight in the concomitant agent is such that water is 100 to 300, the above D is 500 to 1000, the above G is 50 to 150 and the above H is 2 to 5.

2. A method of treatment for utilization as resources using an inorganic electrolyte setting agent, configured to use an inorganic electrolyte setting agent according to claim 1, comprising:

mixing the main agent to an object to be treated, and then mixing the concomitant agent, thereby allowing heavy metal ions in the object to be treated to be blocked.

* * * * *